Nov. 14, 1967     E. J. PICKELSIMER     3,352,286
PORTABLE ANIMAL FEEDER
Filed Dec. 27, 1966
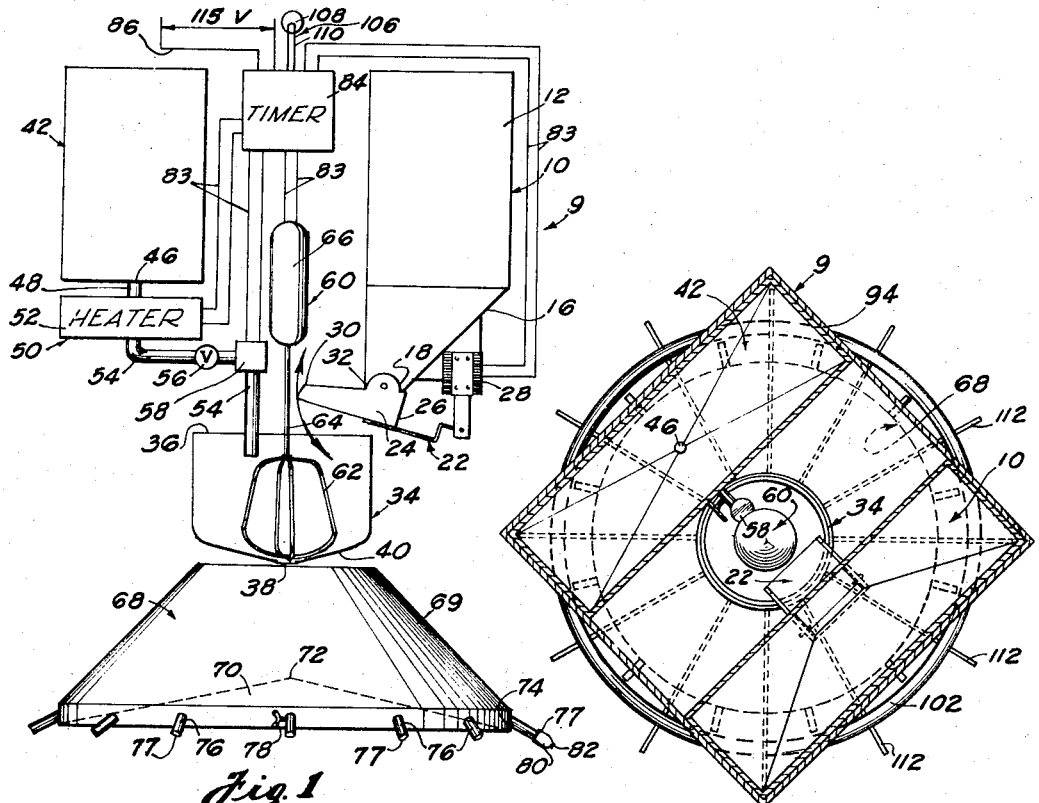
Fig. 1
Fig. 3
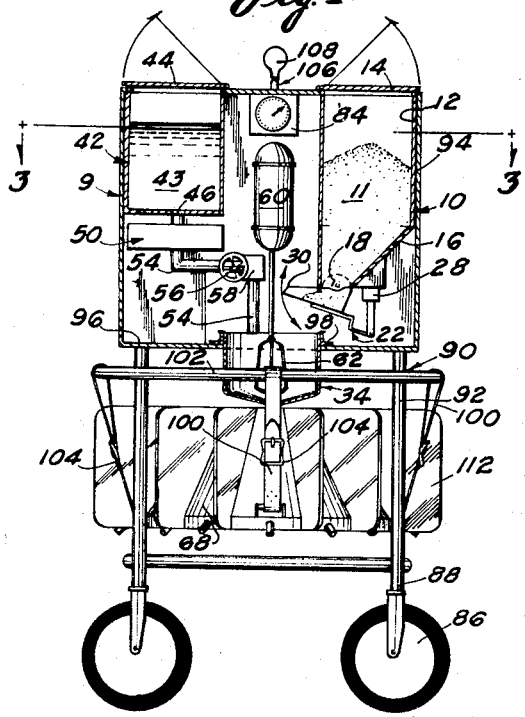
Fig. 2
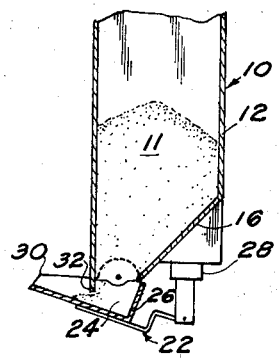
Fig. 4
INVENTOR
EMORY J. PICKELSIMER
BY Newton, Hopkins,
Jones & Ormsby
ATTORNEYS

United States Patent Office 3,352,286
Patented Nov. 14, 1967

3,352,286
PORTABLE ANIMAL FEEDER
Emory J. Pickelsimer, 990 Glendale Drive,
East Point, Ga. 30044
Filed Dec. 27, 1966, Ser. No. 604,904
6 Claims. (Cl. 119—51.11)

ABSTRACT OF THE DISCLOSURE

A portable apparatus for feeding livestock, having a centrally located mixing compartment into which a solid food and a heated liquid are introduced in measurable amounts, the solid food being supplied from a hopper and the liquid supplied from a reservoir through an intermediate heating coil. An electrically driven mixer within the mixing compartment comminutes and mixes the solid food and liquid. Disposed below the mixing compartment and communicating therewith is a food delivery compartment having a centrally raised bottom and a plurality of angularly outwardly extending, structurally separated feed tubes through which mixed feed material may be withdrawn. The entire apparatus is vertically adjustable, electrically energized and mounted on wheels for easy movement between feeding stations.

Cross-references to related applications

This application is a continuation-in-part of my copending application Ser. No. 518,523, filed Dec. 29, 1966.

Background of the invention

The present invention relates generally to feeding devices for livestock, and more particularly to a portable device incorporating means for mixing dry food with heated liquid prior to delivery of the mixture to the livestock.

Previous studies have shown that nursing calves are unable to secure a regular and substantial quantity of feed milk from a cow because of many factors. One of those factors is the insufficiency of room surrounding the cow's udder causing several of the calves to be denied a regular and substantial feeding. Moreover, the cow's production of milk varies irregularly causing a lack of milk at certain feeding times.

The above described feeding problem encountered by the livestock producer seems to be quite old considering the number and variety of structures proposed in the past. None, however, disclose a wheeled apparatus which is portably movable to a variety of removed feeding stations, includes a substantially circular food delivery compartment having a plurality of laterally extending feed tubes, and further includes separating partitions positioned between each feed tube so that a feeding calf must align his body with the feed tube and not block adjacent feed tubes. Moreover, none of the references disclose an apparatus which is manually set for different proportions of feed material and electrically operated thereafter.

Summary of the invention

An important object of the present invention is the provision of an animal feeding device from which a plurality of feedings of predetermined quantity may be obtained over an extended period of time with a single loading, and in which stored food will not spoil between feedings.

Another object of the invention is the provision of an electrically timed automatic liquid feeding device in which the dry food is kept isolated from the mixing liquid until the device is energized.

A further object of the invention is the provision of a circular feed delivery compartment having a plurality of structurally separated feed tubes, all of which permit the feeding of a maximum number of livestock at one time.

Another object of the invention is the provision of a compact, easily transportable animal feeding device which is relatively light in weight and simple in construction.

Another object of the invention is the provision of an animal feeding device which carries its own light source and is verticallw positionable at a variety of heights so that night feedings of younger animals may be accomplished.

Briefly described, the present invention comprises a solid food hopper and a liquid reservoir, individually communicating with a lower mixing compartment. Disposed intermediate the liquid reservoir and the mixing compartment is a heating coil and an electrically operated liquid shut-off, both connected to a single source of electric power. Disposed intermediate the solid food hopper and the mixing compartment is an electrically operated solid food shut-off electrically connected to the same single source of electric power. Electrically driven mixing means are provided within the mixing compartment to comminute and mix the solid food material and liquid as it is added. Disposed below the mixing compartment and communicating therewith is a food delivery compartment having lower peripheral feed tubes through which a nursing animal may withdraw the heated food supply. The apparatus is vertically adjustably mounted on a wheeled carriage which also carries a light source.

The above and further highly important objects, features and advantages of the present invention will become apparent from the following description, when taken in conjunction with the accompanying drawings, wherein like characters of reference designate corresponding parts throughout the several views.

Brief description of the drawings

FIG. 1 is a diagrammatic view showing the arrangement and interrelationship of the various elements of the present invention.

FIG. 2 is a front elevational view of one embodiment of the portable animal feeder of the present invention.

FIG. 3 is a horizontal section of the embodiment shown in FIG. 2, taken on the line 3—3 of FIG. 2.

FIG. 4 is a vertical section of the solid food hopper and solid food shut-off, some parts being broken away.

Description of the illustrated embodiment

Referring to FIGS. 1–4 of the drawings, a diagrammatic illustration of the operative elements of the animal feeding device 9 is disclosed. In this arrangement, there is provided a hopper 10 for the reception of finely divided dry food material 11 such as commercially available relatively stable powdered or granular milk replacer. The upper portion 12 of hopper 10 is generally rectangular and carries a cover 14 hingedly attached to one wall surface of the hopper. The lower portion 16 of hopper 10 tapers inwardly toward an outlet 18. Positioned below outlet 18 and in communication therewith is solid food shut-off 22 comprising an open ended trough 24 hingedly attached at its closed end 26 to hopper 10. In its non-discharge position, open ejection end 30 of trough 24 is substantially above lower lip 32 of outlet 18. In this position, food material 11 is effectively retained within hopper 10. Operatively connected to trough 24 is a vibrator 28 which, when electrically energized, causes trough 24 to vibrate in one vertical plane from a position with open ejection end 30 substantially above the lower lip 32 of outlet 18 to a position with open ejection end 30 substantially below lower lip 32. The jogging motion produced by this movement of trough 24 permits the gradual discharge and transfer of granular food material 11 from hopper 10.

Positioned substantially below ejection end 30 of trough 24 is mixing compartment 34 having a receiving mouth 36 directly under and spaced from ejection end 30. Mixing compartment 34 further includes an aperture 38 formed in its lowermost wall section 40. Aperture 38 is of a size and diameter sufficient to cause liquid and solid material to be temporarily retained within mixing compartment 34.

Disposed adjacent hopper 10, is liquid reservoir 42 within which is placed a liquid food 43, such as water, for use in combination with dry granular material 11 to produce a feed material slurry suitable for feeding to nursing livestock. Reservoir 42 has an open top which is normally covered by lid 44, and a bottom wall which defines an orifice 46 through which fluid 43 flows. Communicating with orifice 46 is conduit 48 which communicates at its opposite end with heater 50. Heater 50 consists of a conventional electrical resistance heating element (not shown) disposed within a housing 52 through which liquid 43 from reservoir 42 flows. A thermostat (not shown) is also provided so that the fluid passing through heater 50 is heated to a predetermined temperature.

Carrying the heated liquid from heater 50 is tubing 54 which includes a manually adjustable flow rate regulator 56 and an electrically operated liquid shut-off 58. Liquid shut-off 58 comprises a conventional solenoid operated valve (not shown) well known in the art and designed to permit the continuous flow of liquid through tubing 54 while electrical energy is supplied to the solenoid. From shut-off 58, tubing 54 extends into receiving mouth 36 of mixing compartment 34.

Thus, it may be seen that upon supplying electrical energy to vibrator 28 below hopper 10 and liquid shut-off 58, dry feed material 11 and liquid 43 are discharged into mixing compartment 34. By adjusting liquid flow rate regulator 56, according to the flow rate of solid feed material 11, an appropriate proportion of liquid to solid may be continuously established within mixing compartment 34.

When a charge of dry food material 11 and liquid 43 is discharged into mixing compartment 34, it is highly desirable that the dry food material 11 be thoroughly mixed and dissolved in the liquid 43 before being fed to a suckling animal. To insure a proper mixing and dissolving of the dry food material with the liquid, there is provided an agitator 60 comprising a pair of cooperating agitator shafts. 64. Agitator shafts 64 are driven by an electric motor 66 positioned substantially above mixing compartment 34 and between hopper 10 and reservoir 42. Agitator blades 62 are disposed within mixing compartment 34 and are spaced inwardly from the side and bottom walls thereof.

Disposed substantially below mixing compartment 34 and communicating therewith is food delivery compartment 68. Compartment 68 is spaced downwardly from bottom wall 40 of mixing compartment 34 and receives mixed feed material from mixing compartment 34 through aperture 38. Food delivery compartment 68 is substantially circular in horizontal cross section, has upwardly tapering wall sections 69 and is provided with a bottom 70 having a raised central portion 72 relative to the peripheral edge 74 thereof. Bottom 70 has the appearance of an inverted cone and functions to direct feed material within feed delivery compartment 68 toward the peripheral edge 74 of compartment 68. Communicating with peripheral edge 74 and angularly downwardly extending therefrom are a plurality of hollow feed tubes 76 regularly spaced around the lower perimeter of compartment 68. Feed tubes 76 are individually provided with manually operable stop-cock valves 78 which regulate the flow of feed material therethrough. A hollow collapsible resilient bulbous suckling nipple 80 extends outwardly from the outer end 77 of each feed tube 76 and is provided at its outer end with a relatively small feeding aperture 82. Each nipple 80 resiliently grips the exterior surface of its feed tube 76 and is retained thereon.

In operation, each of the electrically operated elements, heater 50, liquid shut-off 58, agitator 60 and solid feed shut-off 22, are electrically connected, by wiring 83, to a single source of electrical energy such as a time clock 84. Clock 84 is in turn electrically connected to a convenient source of electric current (not shown) through wires 86. Clock 84 is set to continuously supply electric energy to each of the electrically operated elements for a predetermined length of time. During that span of time, liquid 43 flows from reservoir 42 through heater 50, rate regulator 56 and shut-off 58 to mixing compartment 34. At the same time, dry feed material 11 is discharged into mixing compartment 34 by open-ended trough 22. As previously mentioned, the rate of liquid and dry feed is adjusted so that the two are properly proportionate for a good feed mix. Within mixing compartment 34 agitator blades 62 comminute and dissolve dry feed material 11 within the liquid 43. The mixed feed material then flows through aperture 38 in the base of mixing compartment 34 and into food delivery compartment 68. Raised central portion 72 then directs the descending feed material toward the lower peripheral edge 74 of bottom 70. At that point, the material collects for subsequent removal by a suckling animal.

Upon completion of the feeding operation at one feeding station, the feeding device is conveniently rolled to a different feeding station by means of wheels 86 pivotally mounted on legs 88. Legs 88 depend downwardly from supporting frame 90 consisting of a carriage 92 and a rectangular housing 94 carried by the carriage. Housed within housing 94 are the hopper 10 and reservoir 42 positioned adjacent one another within the upper portion of housing 94. Heater 50, manual flow rate regulator 56, liquid shut-off 58 and associated conduits and tubing 48 and 54 are housed within the lower portion of housing 94. Also disposed within the housing 94 are solid material shut-off 22, mixer 60, time clock 84 and related wiring 83. Fixedly attached to housing 94 and extending through its floor wall 96 is mixing compartment 34. Brackets 98 preferably are employed to secure the mixing compartment 34 to floor wall 96.

Vertically adjustable within the lower portion of carriage 90 is food delivery compartment 68. In this embodiment, straps 100, fixedly attached at one end to delivery compartment 68, are employed to provide a quick and efficient means for vertically adjusting the position of delivery compartment 68. Straps 100 are looped over horizontal frame member 102 of carriage 90 and returned and fastened to a buckle 104 fixedly positioned upon an intermediate portion or strap 100.

The feeding device also carries its own light source 106 comprising incandescent lamp 108 and appropriate wiring 110 electrically connected to time clock 84. Consequently, feedings in dimly lit sections of a feeding station or at night may be performed.

Provided between each feed tube 76 is an animal separating partition 112 of a height and depth sufficient to prevent one suckling animal from interfering with the use of adjacent feed tubes 76 by other suckling animals. Each partition 112 extends outwardly from food delivery compartment 68 and is attached along its length to the exterior surface of that compartment between adjacent feed tubes.

Upon the completion of all feedings, the animal feeding device 9 may be quickly and easily cleaned by removing each of the nipples 80, exposing the outer end 77 of each hollow feed tube 76, disconnecting solid food shut-off 22 from the time clock 84, and energizing the feeding device while maintaining an adequate supply of liquid within reservoir 42. Periodically, cleansing solution is added to reservoirs 42 and the above cleaning operation is performed. Without the addition of cleansing solution to reservoir 42, the feeding device is adequately rinsed by the circulation of clean liquid therethrough. With the addition of cleansing solution, the device is thoroughly cleansed.

While one embodiment of the invention has been disclosed, it should be recognized that various modifications of the invention may be made without departing from the spirit, scope and principles thereof. Such modifications should be considered as included in the hereinafter appended claims unless those claims by their language expressly provide otherwise.

Having thus described the invention, what is claimed and desired to be secured by Letters Patent is:

1. Apparatus for automatically dispensing animal food comprising:
   a portable supporting frame,
   an upper housing rigidly mounted on said frame,
   a lower housing supported by said frame, means for vertically adjusting said lower housing with respect to said upper housing,
   said upper housing including:
      a feed hopper for storing and dispensing solid food,
   a reservoir positioned in spaced relationship with said feed hopper for storing and dispensing liquid,
   a mixing compartment centrally located below said feed hopper and said reservoir defining an opening in its lower surface and constructed to receive solid food from said feed hopper and liquid from said reservoir,
   vibrating means connected to said feed hopper for controlling the dispensing of solid food from said feed hopper to said mixing compartment,
   valve means connected to said reservoir for controlling the flow of liquid from said reservoir to said mixing compartment,
   heating means connected between said reservoir and said valve means for heating the liquid as it is dispensed from said reservoir to said mixing compartment, and
   agitating members disposed in said mixing compartment for mixing together the food and liquid,
   said lower housing comprising:
      a food delivery compartment defining an opening in its upper portion disposed below the opening of said mixing compartment,
   a plurality of feeding tubes extending generally radially outwardly of said food delivery compartment at spaced intervals thereabout and communicating therewith, and
   a generally radially outwardly extending partition positioned between each of said feeding tubes.

2. The invention of claim 1 wherein said upper housing includes timing apparatus operatively connected to said vibrating means and said valve means for controlling the period of operation of the apparatus.

3. A portable animal feeder as recited in claim 1 wherein said food delivery compartment is circular in horizontal cross section and includes a bottom having a raised central portion relative to the peripheral edges thereof.

4. A portable animal feeder as recited in claim 1 wherein said supporting framework includes a plurality of wheels for movement of said feeder; and said housing carries an incandescent lamp for illuminating the feeder during darkness.

5. A portable animal feeder as recited in claim 10 including means for automatically introducing the solid food and liquid into said mixing compartment according to a predetermined time schedule.

6. A portable animal feeder as recited in claim 1 wherein said feed tubes include means for interrupting and redirecting the flow of said mixed solid and liquid food therethrough.

References Cited

UNITED STATES PATENTS

| | | | |
|---|---|---|---|
| 2,988,048 | 6/1961 | Zimmerman | 119—81 |
| 3,037,481 | 6/1962 | Kloss | 119—71 |
| 3,043,265 | 7/1962 | Atchley | 119—71 X |
| 3,122,131 | 2/1964 | Warren | 119—81 X |
| 3,192,902 | 7/1965 | Gammill | 119—51.11 |
| 3,196,835 | 7/1965 | Bergevin | 119—51.11 |
| 3,204,607 | 9/1965 | Arnold et al. | 119—51.11 |
| 3,208,431 | 9/1965 | Kloss | 119—71 X |
| 3,216,397 | 11/1965 | Pickard | 119—71 |

OTHER REFERENCES

Farm Implement and Machinery Review, July 1, 1954, page 481, column 1.

ALDRICH F. MEDBERY, *Primary Examiner*.